United States Patent [19]
Kleine

[11] Patent Number: 5,735,648
[45] Date of Patent: Apr. 7, 1998

[54] TOOL BIT WITH CARRIER MEMBER AND CUTTING MEMBER

[75] Inventor: Werner Kleine, Achim, Germany

[73] Assignee: Hilti Aktiengesellschaft, Schaan, Liechtenstein

[21] Appl. No.: 566,575

[22] Filed: Nov. 28, 1995

[30] Foreign Application Priority Data

Nov. 28, 1994 [DE] Germany ............... 44 42 266.0

[51] Int. Cl.⁶ ............... B23B 51/00; E21B 10/36
[52] U.S. Cl. ............... 408/144; 76/108.2; 76/DIG. 10; 175/420.1; 175/426; 175/435; 407/118; 408/224; 408/227; 408/231
[58] Field of Search ............... 408/144, 231, 408/223, 224, 227, 228; 175/420.1, 426, 427, 428, 431, 432, 433, 435; 76/108.1, 108.2, 108.6, DIG. 10, DIG. 11; 407/118

[56] References Cited

U.S. PATENT DOCUMENTS

| | | | |
|---|---|---|---|
| 2,614,813 | 10/1952 | Shepherd | 175/420.1 |
| 2,784,943 | 3/1957 | Bylund | 175/420.1 |
| 4,951,762 | 8/1990 | Lundell | 76/108.2 |
| 5,197,556 | 3/1993 | Jordan | 175/432 |
| 5,265,989 | 11/1993 | Stock | 175/426 |
| 5,630,478 | 5/1997 | Schimke | 175/435 |

FOREIGN PATENT DOCUMENTS

| | | |
|---|---|---|
| 0322565 | 11/1988 | European Pat. Off. . |
| 0353214 | 7/1989 | European Pat. Off. . |
| 0671959 | 2/1939 | Germany . |
| 2952295 | 7/1981 | Germany . |

Primary Examiner—Steven C. Bishop
Attorney, Agent, or Firm—Anderson, Kill & Olick, P.C.

[57] ABSTRACT

A tool bit for use in at least one of a drilling and cutting operation is formed of an axially extending carrier member (1) and a cutting member (2). The cutting member (2) has an expansion joint (2a) extending parallel to the axis of the carrier member (1). The expansion joint (2a) is formed by reducing the thickness of the cutting member (2) so that material webs (2b) remain. In the fabrication and formation of the tool bit, the cutting member (2) is a single unit. In the use of the tool bit, due to the expansion joint the cutting member forms individual operating units (2a) affording reduced material expense of the cutting member (2), because of reduced stresses.

20 Claims, 7 Drawing Sheets

TOOL BIT WITH CARRIER MEMBER AND CUTTING MEMBER

BACKGROUND OF THE INVENTION

The present invention is directed to a drilling and/or cutting tool bit, in particular for work on concrete, rock, masonry and similar materials, and includes a carrier member having a working end in which a cutting member formed of a hard material, carbide metal or the like is provided.

Known tool bits, especially for use in concrete, rock, masonry and similar materials comprise a tubularly or cylindrically shaped carrier member having a working end provided with a cutting member formed of the harder material, such as a hard metal or cutting alloy, carbide metal and the like. The cutting member projects from the working end at least in the axial direction and often, in addition, radially outwardly from the carrier member so that it can cut material.

Such tool bits can be formed as pure drilling or cutting drill bits or they can serve to provide both functions. Depending on the intended use, the carrier members are designed in different ways. If a drilling tool bit as well as a drilling and cutting tool bit is required, the carrier member is equipped with a drilling material removal device such as a helix. Such a removal device, and in particular a helical one is unnecessary where the tool bit is used only for cutting purposes.

Further, the cutting members can have different shapes depending on the intended use. A shape in wide use is a cutting plate. Additional shapes can be used for specific applications, such as drill bits with a cross type cutting surface when viewed perpendicularly of the axis to the tool bit. Such cutting surfaces have a cross-shaped section and the individual legs can be positioned at different angles relative to one another.

It is common to all tool bits that the carrier members have recesses for receiving the cutting members in a positively locked manner. Such recesses are matched to the shape of the cutting members, for instance if the cutting members are plates the recesses are in the form of slots which extend into the working end of the carrier member. The cutting members are secured in the recesses by soldering.

The completely different properties of the materials used for the carrier member and the cutting member result in different heat expansion coefficient for these members. This is particularly apparent when soldering the two members because of the stresses which develop and increase with the increasing size of the surfaces being soldered together. On one hand the stresses can result in cracks in the soldering seam and the other hand may entail damage to the cutting members. Failure of the tool bit due to detachment or fracture of the cutting members can result.

The above disadvantages related to the stresses developed can to some extent be counteracted by selectively dimensioning the cutting members, for instance, by equipping the tool bits having increasing larger dimensions with cutting members of increased thickness.

These disadvantages, however, cannot be completed eliminated by the measures mentioned above, wherein as a result of such measures additional disadvantages are created. Such an additional disadvantage involves the weakening of the working end of the carrier member due to the larger recesses required for cutting members. From a manufacturing viewpoint further disadvantages are created, since it is necessary to provide additional cutting apparatus for forming the recesses in the carrier member for each tool bit size. Another disadvantage is of an economic nature, since a higher expense is involved for the material used in the cutting members. Accordingly, an increase in the width of the cutting members where a large dimension of the tool bits is involved leads to a considerable additional expense for the tool bits. This increased expense involves the disadvantage that the cost of the material rises exponentially. A doubling of the amount of material required does not really amount to a doubling of the price, rather it involves a greater multiple of the price.

A larger dimensioned tool bit is disclosed in DE-PS 401 188 where instead of a single continuous cutting member, several cutting members are provided distributed equally across the diameter of the carrier member. The thickness of the individual cutting plates or members can be dimensioned smaller in view of the stresses developed because of the different heat expansion coefficients and also becoming smaller with progressively reduced surfaces. In a certain way this results in an advantage when considered with respect to the cost of the material.

The advantage gained in the cost of the material, however, is lost due to the increased manufacturing expense of the known tool bit, since in the course of manufacture instead of a single cutting member, several cutting members must be individually positioned and secured in place.

SUMMARY OF THE INVENTION

Therefore, the primary object of the present invention is to provide a tool bit limiting both the cost of the materials and of fabrication and, in addition, affording a long useful life.

In accordance with the present invention, a drilling and/or cutting tool bit is provided which has at least one expansion joint extending in the axial direction of the carrier member and parallel to its axis.

The expansion joints formed according to the invention run essentially parallel to the tool bit or carrier member axis and subdivide the cutting member into functional sections wherein each one of these sections acts as an individual cutting member. As a result, the stresses which develop are limited to a single individual section. Therefore, when selecting the thickness of the cutting member, it is not necessary to use the entire width of the cutting member measured perpendicularly to the tool axis, instead only the measured width of an individual section is involved. Accordingly, the cutting member thickness is quite noticeably reduced and results in a reduction of the material cost of the cutting member, and in the overall cost of the cutting member. Since the expansion joints assure the connection of the individual sections of the cutting member before its insertion into the carrier member, it is possible to place the individual sections just as would be the case in a single piece cutting member. Therefore, additional expenses do not arise in the manufacture of such tool bits.

Further there is a fabrication advantage in that the recesses for the cutting members or sections are always equal, even with different dimensions of the tool bit, since the selection of a standard width cutting member is possible. The uniform or standard width of the recesses for the cutting members is additionally much smaller so that the disadvantageous weakening of the working end of the carrier member is eliminated even for tool bits of larger dimensions.

Before its connection in the carrier member, the cutting member is considered as a single unit, that is, particularly as it is positioned for placement. The arrangement of the individual sections after the attachment is effected by soldering breaks down the cutting member into individual sections. The expansion joint embodying the present invention has no further active function after the connection of the cutting member in the carrier member, on the contrary it assists in subdividing the cutting member functionally into the individual sections.

The expansion joint is formed in a preferred manner by reducing the thickness of the material forming the cutting member so that at least one narrow web of material remains between the individual sections. Preferably with the reduction of the material, the remaining web is located centered between the opposite faces of the cutting members, that is centered in the thickness dimension. The shape of the reduced thickness portion can be designed in different ways. Accordingly, the transition from the side faces of the cutting member sections to the expansion joint can extend at a right angle or at some other angle. For example, where it is not at a right angle, the shape of the material reduction can be V-shaped on both side faces of the cutting member.

By forming the expansion joint as a reduction in thickness, there is the further advantage that a reservoir is formed for receiving the solder required for securing the cutting member to the carrier member. As a result, this avoids the disadvantage where there was insufficient room for the solder thereby causing an inadequate or unsatisfactory connection.

The use of the expansion joint as a solder reservoir can be effected in two ways, in one way the expansion joint can be filled with a solder by the manufacturer of the cutting members, so that the cutting member and the solder form a complete unit. Accordingly, further simplification is achieved in the fabrication of the tool bits. In the other way, the solder can be supplied to the expansion joint when the tool bits are being fabricated, and this entails the positioning of the solder in a simplified method as compared to what has been done in the past.

The web formed in the expansion joint can be continuous along the axially length of the cutting member or it can be interrupted. If a continuous web is used, preferably it runs for the entire length of the cutting member measured parallel to the tool bit axis. If an interrupted web is used, several remaining webs or webbed sections can be formed along the axial length extending parallel to the tool bit axis, for instance, two spaced individual webs sections can be provided.

To assure the properties required for the expansion joint, the thickness of the webs measured perpendicularly to the tool bit axis corresponds approximately to the range of 0.1 to 0.5 times the thickness of the cutting member measured in the same direction. Material webs dimensioned in this way lead to a functional decoupling of the individual sections from one another and thus to a division of the entire cutting member into individual operating units.

Preferably, several expansion joints are provided which subdivide the width of the cutting member measured perpendicularly to the tool bit axis into approximately equal sections. Accordingly, two expansion joints can be formed providing three sections. In the case of three sections, the middle section forms a centering tip.

The arrangement of the expansion joints permits different designs of the cutting members, in particular as far as an intended use is concerned. Accordingly, the cutting members can have a cutting edge on the working end which diverges in a known manner at an acute angle to the centering tip. Such a cutting tip is conventional as far as dimensioning of the cutting members is concerned, however, it has been provided with the inventive expansion joints. In a refinement of the invention, the expansion joints can be used as a basis for particular designs of the cutting members. Thus, it is possible to form the cutting members with very aggressive cutting shapes.

The cutting edge can be formed in a preferred embodiment, so that the regions directly adjacent to the expansion joints extend at an angle to one another and thus do not form a planar transition from one side of the expansion joint to the other. With regard to the tool bit axis, the regions of the cutting edge directly adjacent to the expansion joints can run at an angle to one another and in another preferred embodiment they can be arranged forming an obtuse angle.

To provide an aggressive shape, the cutting member can be configured so that the cutting edge has sections offset axially relative to one another.

It is possible to offset the cutting edge sections by providing axial steps in the region of the expansion joints, such an arrangement improves the centering of the tool bit by providing a particularly pronounced centering tip.

It is also possible in offsetting the cutting edge sections in the region of the expansion joints to provide oppositely oriented angles. Therefore, the inclination of the angles can be varied at random with the possibility of a tip for the outer sections of the cutting members forming a centering tip.

Preferably, the cutting member is formed as a cutting plate so that it can be fabricated economically.

With tool bits of a larger dimension or tool bits with a higher requirement, it is preferable to design the cutting member as a crosshead cutter.

Since the expansion joints according to the invention form diffusion barriers, it is possible in manufacturing the cutting members to provide different material requirements for the regions or sections separated by the expansion joints. Thus, a cutting member can be formed where the material or its condition corresponds to the particular application for the use of the bit. It is possible, for instance, to provide a higher hardness to the outer sections of the cutting member while a greater toughness is of primary importance for the central section. In the course of fabricating by sintering, this can be achieved by appropriate alloy additives.

BRIEF DESCRIPTION OF THE DRAWINGS

FIG. 2c is an enlarged view of the detail B in FIG. 2a;

DETAILED DESCRIPTION OF THE EMBODIMENTS OF THE INVENTION

Figure 1:
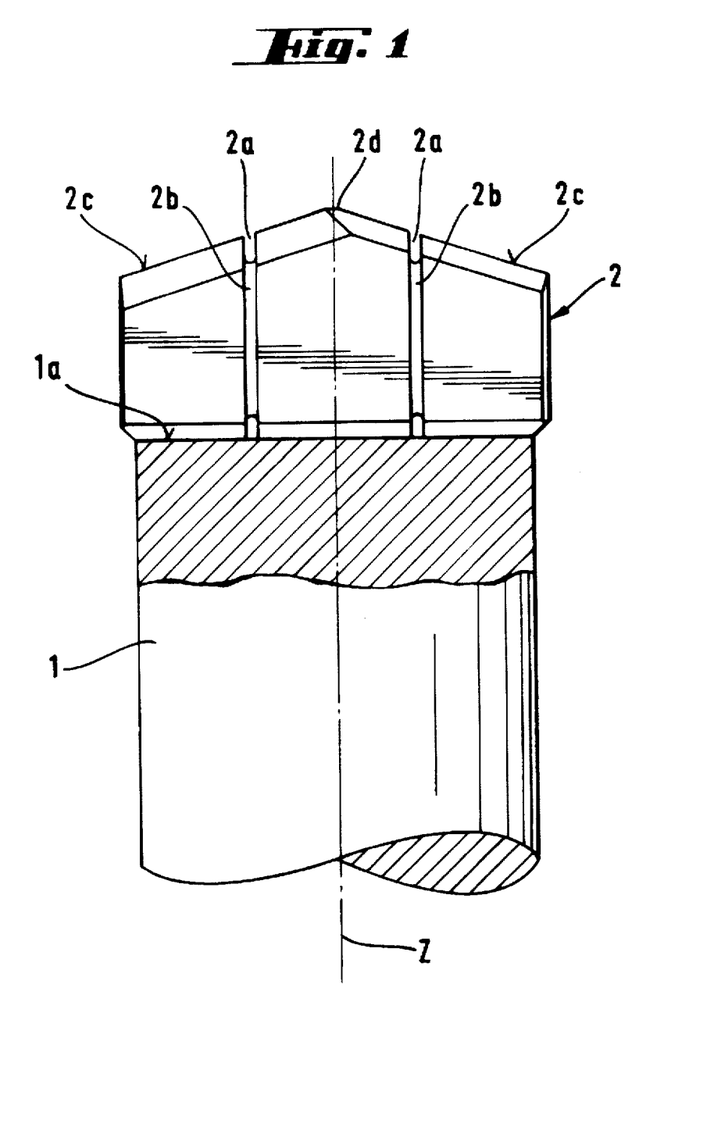
FIG. 1 is an elevational view, partly in section, of the working end of a tool bit embodying the present invention and formed of a carrier member and a cutting member.
Figure 2:
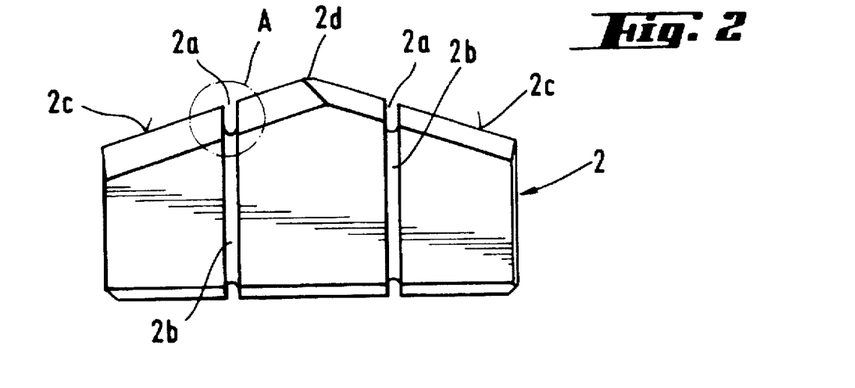
FIG. 2 is an elevational view of the cutting member shown in FIG. 1.
Figure 2A:
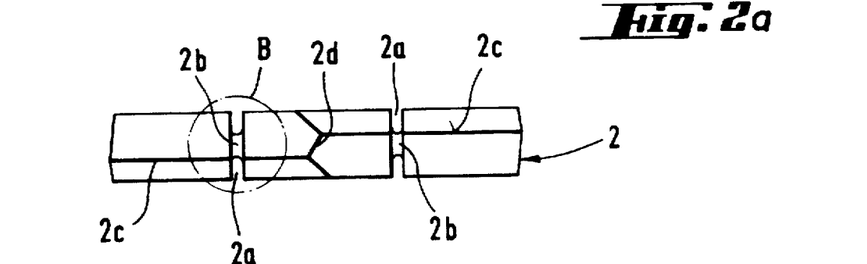
FIG. 2a is the cutting member in FIG. 2 in plan view.
Figure 2B:
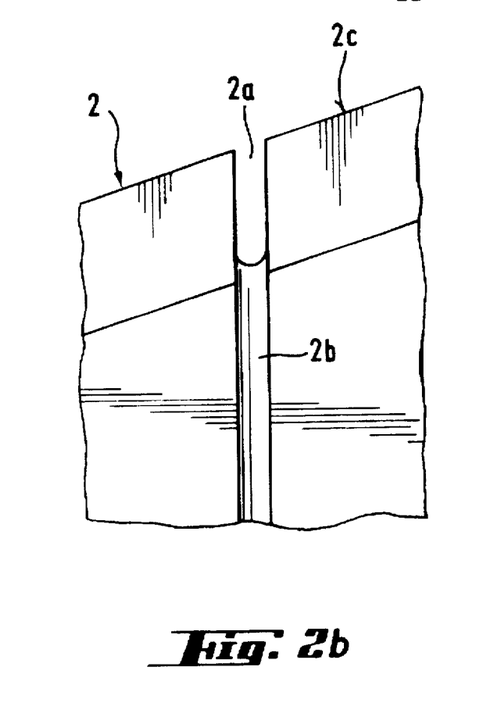
FIG. 2b is an enlarged view of the detail A in FIG. 2.
Figure 2C:
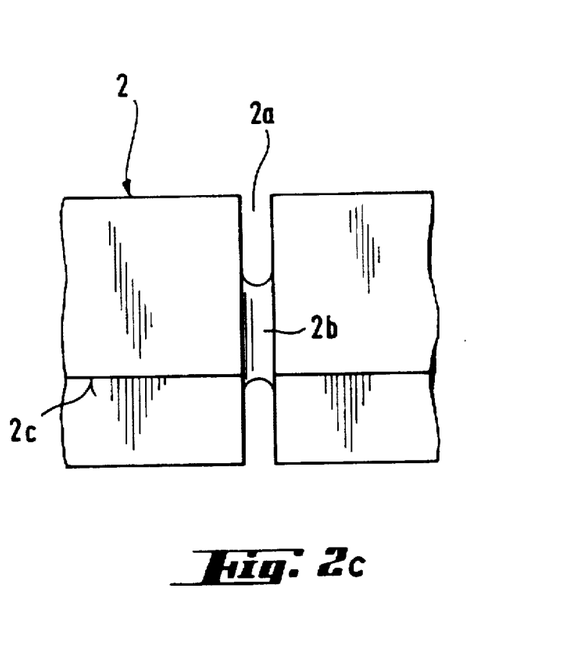

In FIG. 1 the working end of a tool bit is shown formed of a carrier member 1 and a cutting member 2 with a axis Z extending through the carrier member and the cutting member. The cutting member 2 is secured in a positively locked manner in a recess 1a in the working end of the carrier member 1. The cutting member 2 has two expansion joints 2a extending parallel to and offset radially from the tool bit axis Z and formed by a reduced thickness recessed section of the member forming a material web 2b extending for the axial dimension of the cutting member. The cutting member 2 has a cutting edge 2c on its working end, that is the upper end in FIG. 1, and the cutting edges converges inwardly to a centering tip 2d with the surfaces on the opposite sides of the centering tip forming an obtuse angle measured clockwise from the left-hand portion of the cutting edge to the right-hand portion. The cutting edge 2c is in the form of a flattened arrowhead-like shape. Due to the expansion joints 2a, the width of the cutting member is subdivided into three sections, as can be seen in FIG. 1.

FIGS. 2, 2a, 2b and 2c show the cutting member 2 of FIG. 1, however, without the carrier member 1. The cutting member 2 has the expansion joints 2a and the webs 2b formed in the expansion joints as well as the cutting edge 2c forming the centering tip 2d. In the enlarged showing in FIG. 2b, the web 2b of the expansion joints is displayed more clearly centered between the side faces or surfaces of the cutting member, extending parallel to the axis Z. The web is inset from each of the side surfaces as can be seen best in FIG. 2c. The webs 2b extend for approximately the full axial length of the expansion joints 2a.

Figure 3:
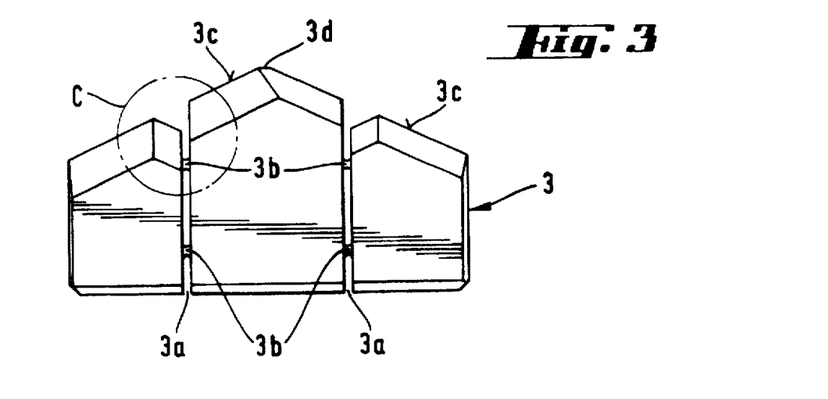
FIG. 3 is another cutting member embodying the present invention shown in elevation.

In FIG. 3 a cutting member 3 is illustrated with expansion joints 3a each having two axially spaced material webs 3b. A cutting edge 3c extends at an obtuse angle and forms a centering tip 3d wherein the cutting edge has sections spaced by the expansion joints 3a with the outer sections of the cutting edge having a surface inclined away from the adjoining surface of the center section of the cutting member.

Figure 3A:
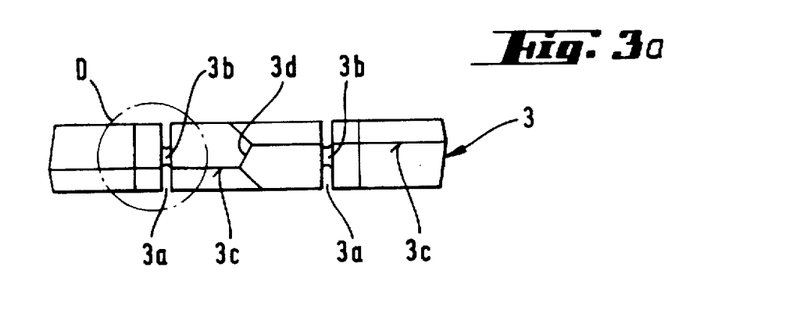
FIG. 3a is the cutting member in FIG. 3 shown in plan view.
Figure 3B:
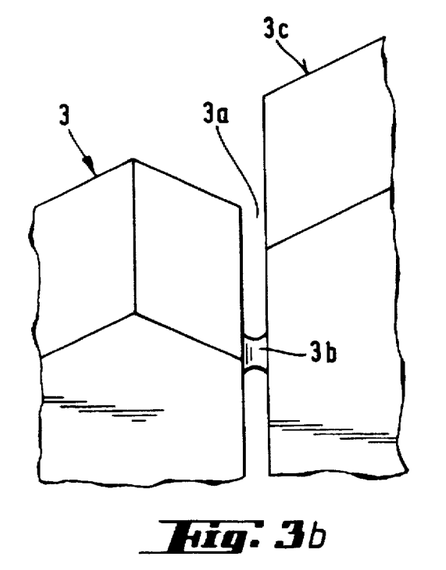
FIG. 3b is the detail C of FIG. 3 shown enlarged.
Figure 3C:
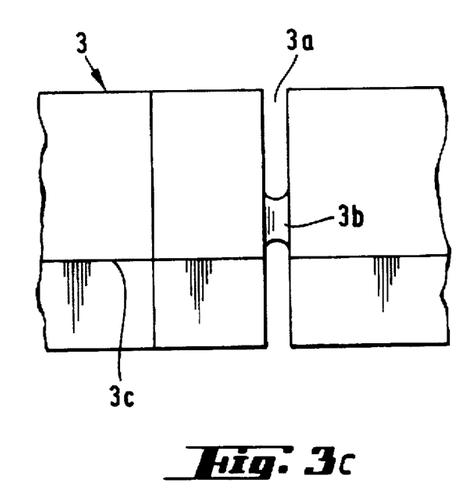
FIG. 3c is the detail D of FIG. 3a shown enlarged.

FIG. 3b shows an enlarged illustration of one of the material webs 3b in the expansion joint 3a. FIG. 3a shows the centered arrangement of the web 3b relative to the side surfaces of the cutting member 3 as is further shown in the enlarged view in FIG. 3c. As in FIG. 2a, in FIG. 3a it can be noted that the cutting edge 3c is offset on each of the opposite sides of the centering tip 3d, so that there is a leading portion and a trailing portion of the cutting edge.

Figure 4:
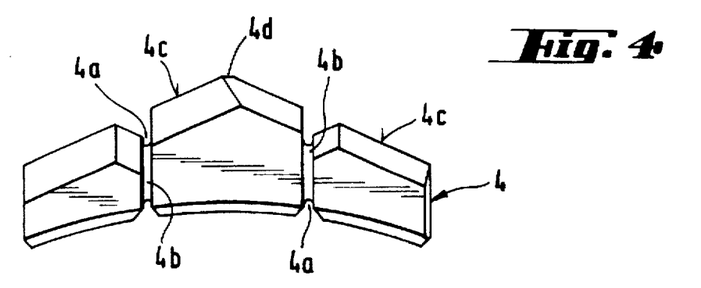
FIGS. 4, 4a, 5, 5a, 6, 6a, 7, 7a, 8, 8a, 9, 9a, 10, 10a, 11, and 11a are additional embodiments of the cutting members of the present invention, each shown in an elevational and a plan view.
Figure 4A:
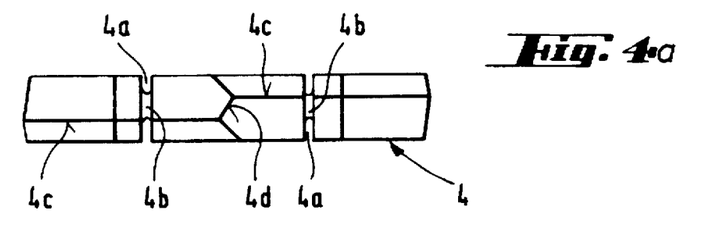

In FIGS. 4 and 4a a cutting member 4 is shown with two axially extending expansion joints 4a each containing a web 4b. The cutting edge 4c of the cutting member 4 is formed at an obtuse angle as in FIG. 1. The cutting edge 4c has a centering tip 4d similar to that in FIGS. 2a and 3a. The opposite end of the cutting member from the cutting edge 4c is formed in a concave manner as can be noted in FIG. 4.

Figure 5:
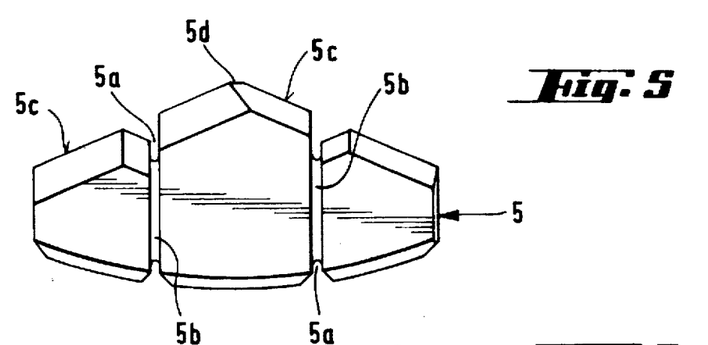
Figure 5A:
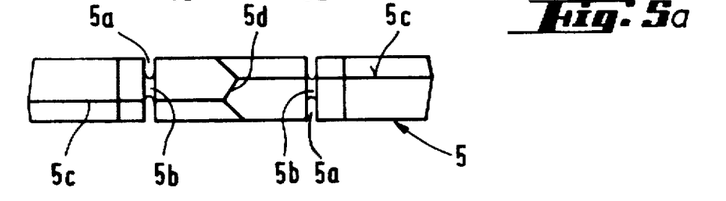

In FIGS. 5 and 5a a cutting member 5 is illustrated with two expansion joints 5a each having a web 5b similar to that in FIG. 4. The web in FIG. 5, as in FIG. 4, extends for approximately the full axial length of the expansion joint 5a. The cutting member 5 has a cutting edge tip 5c, similar to that in FIGS. 4a, and it forms a centering tip 5d. The trailing end of the cutting member 5 is curved in a convex manner as distinguished from the trailing end shown in FIG. 4.

The region of cutting edges 3c, 4c, 5c of the cutting members 3, 4, 5 directly adjacent to the expansion webs 3a, 4a, 5a are disposed at an angle to one another as can be noted in FIGS. 3–5. In other words, the portions of the outer sections of the cutting members are inclined away from the cutting edge. Further, the cutting edge extends at an obtuse angle relative to the tool bit axis.

The concave and convex configuration of the trailing ends of the cutting members 4 and 5, as shown in FIGS. 4 and 5, afford a centering action for aligning the carrier member and the cutting member. This feature has a favorable effect in the fabrication and also in the utilization of the tool bits. In the course of the manufacturing process, the alignment prior to the soldering operation is simplified. When using the tool bit there are centrally directed force components which reduce shear stresses on the soldered seam.

Figure 6:
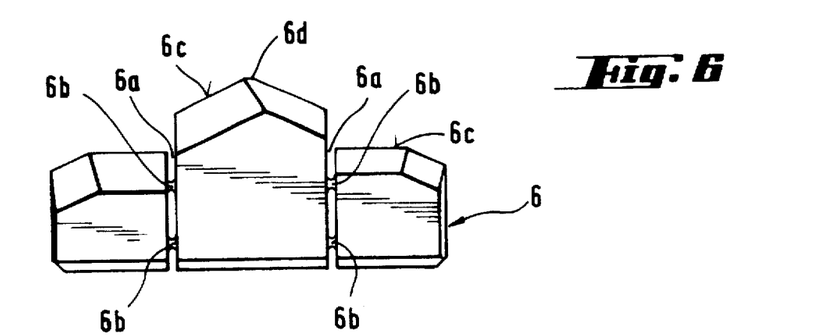
Figure 6A:
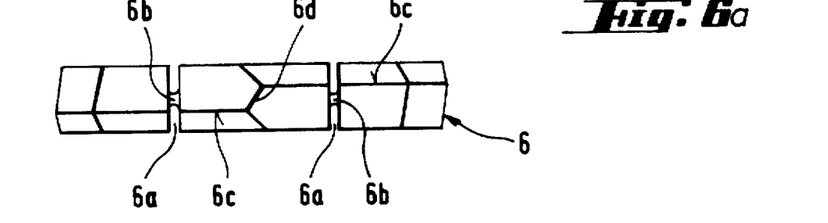

In FIGS. 6 and 6a a cutting member 6 is shown with two axially extending expansion joints 6a and with webs 6b located in the expansion joints and extending for roughly the axial length of the joints. A cutting edge 6c, is offset in the region outwardly from the expansion joints, so that a portion of the cutting edge extends approximately perpendicularly to the axis of the tool bit. The cutting edge has a centering tip 6d located in the center section of the cutting member as well as in the outer sections. Adjacent the expansion joints, the outer sections of the cutting members are offset opposite to the cutting edge formed in the center section of the cutting member.

Figure 7:
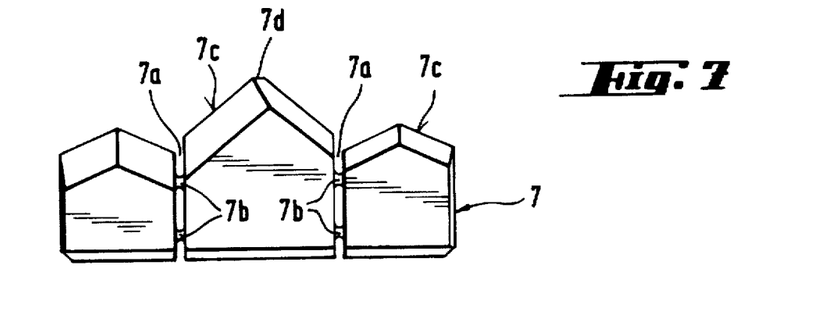
Figure 7A:
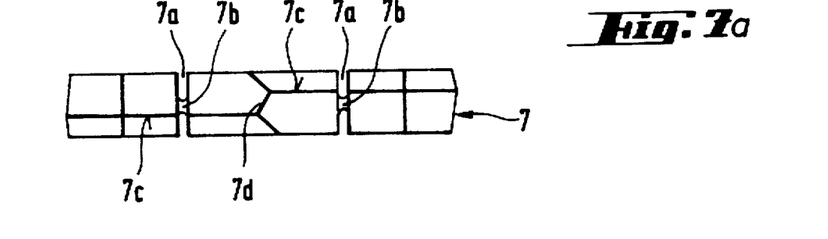

In FIGS. 7 and 7a a cutting member 7 is displayed with two axially extending expansion joints 7a each having a web 7b. In the embodiment in FIGS. 7 and 7a, however, the web 7b is divided into two sections spaced apart in the axial direction with each section of the web being located adjacent opposite ends of the expansion joint 7a. The surfaces of the cutting edge 7c on the outer sections of the cutting member adjacent the expansion points 7a are inclined rearwardly relative to the cutting direction of the tool bit. As a result, the adjacent surfaces of the cutting edge are offset relative to one another.

Figure 8:
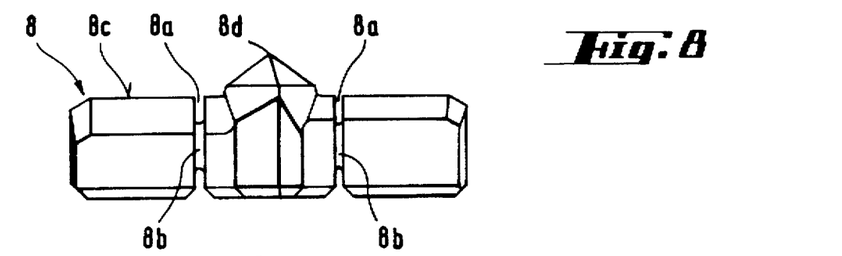
Figure 8A:
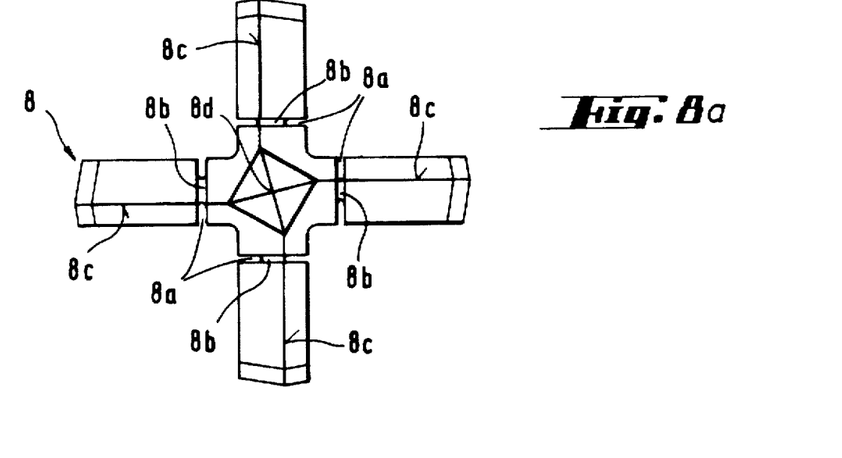

In FIGS. 8 and 8a, unlike the plate-like cutting member shown in the above embodiments, the cutting member is shaped as a crosshead cutter. Four expansion joints 8a are formed each with a material web 8b dividing the cutting member into four legs each extending outwardly from a center section containing a centering tip 8d. As can be seen in these FIGS., the centering tip has a pyramidal shape. The center section of the cutting member 8 has the centering tip projecting axially outwardly from the four legs 8c.

Figure 9:
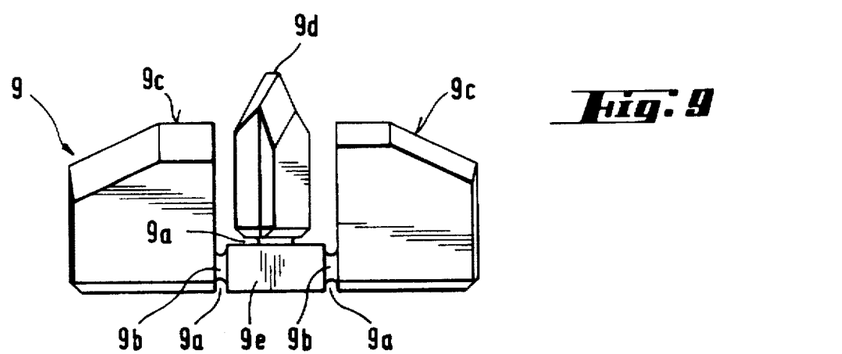
Figure 9A:
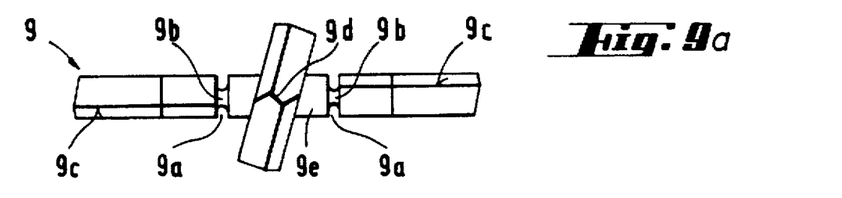
Figure 10:
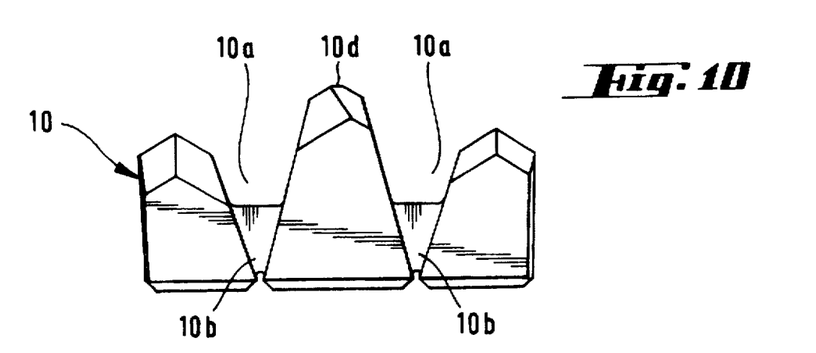
Figure 10A:
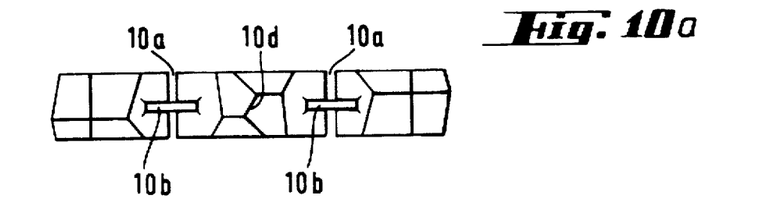

In FIG. 9a cutting member 9 is shown with expansion joints 9a and webs 9b located between two legs and a center base portion 9e. The cutting member 9 is generally in the shape of a plate section separated by a center cutting section on the base portion 9e extending transversely of the plate section. The webs 9b extend between the base portion 9e and the trailing end parts of the adjoining plate-like sections of the cutting member.

Figure 11:
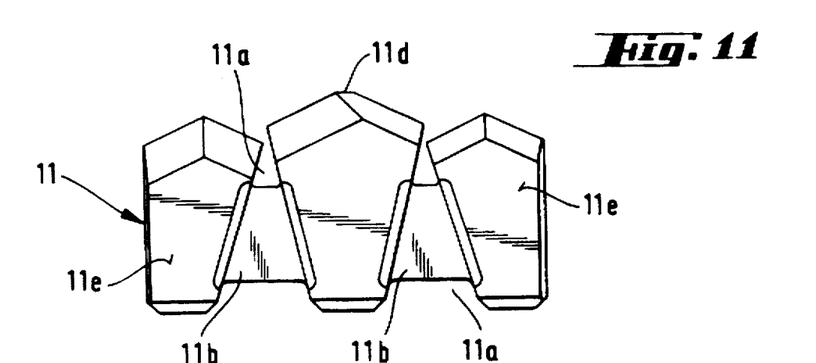
Figure 11A:
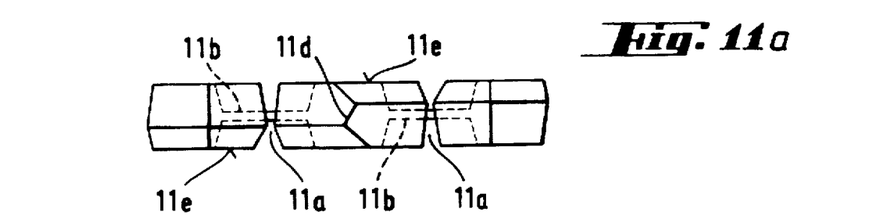

In FIGS. 10, 10a, 11 and 11a, cutting members 10, 11 are illustrated with expansion joints 10a, 11a forming particularly pronounced webs 10b, 11b. In both of these embodiments the webs 10b, 11b in the expansion joints 10a, 11a have a generally V-shaped configuration with the axially extending opposite surfaces of the joints in FIG. 10 diverging towards the cutting edge. In FIG. 11, the opposite sides of the expansion joints 11a converge towards the cutting edge so that the webs have an increased width toward the end of the cutting member opposite the cutting edge. As shown in FIG. 11a, the transition surfaces from the side surfaces 11e of the cutting member 11 into the expansion joints 11a are formed at an obtuse angle. Accordingly, the expansion joints 11a open in a V-shaped manner towards the side surfaces 11e. The center section of the cutting members 10, 11 each has a centering tip 10d, 11d.

What is claimed:

1. A tool bit for use in at least one of drilling and cutting operations in concrete, rock, or masonry, comprising an axially extending carrier member (1) having an axis (Z), said carrier member having a working end, a cutting member (2, 3, 4, 5, 6, 7, 8, 9, 10, 11) formed of at least one of a hard material and a carbide material secured in the working end of said carrier member (1), said cutting member (2, 3, 4, 5, 6, 7, 8, 9, 10, 11) having at least one expansion joint (2a, 3a, 4a, 5a, 6a, 7a, 8a, 9a, 10a, 11a) therein extending substantially parallel to the axis (Z) of said carrier member.

2. A tool bit, as set forth in claim 1, wherein said cutting member having a pair of opposite side surfaces each located in a plane extending parallel to the axis (Z) and said side surfaces being in spaced relation with a thickness therebetween, said expansion joint being formed by reducing the thickness between the side surfaces and forming at least one web (2d, 3d, 4d, 5d, 6d, 7d, 8d, 9d, 10d, 11d).

3. A tool bit, as set forth in claim 2, wherein said web extending for substantially the axial length of said cutting member measured parallel to the tool bit axis (Z).

4. A tool bit, as set forth in claim 2, wherein at least two webs (3b) are located in said expansion joint (3a) spaced axially apart parallel to the tool bit axis (Z).

5. A tool bit, as set forth in one of claims 2, 3, or 4, wherein the thickness of said webs (2b, 3b, 4b, 5b, 6b, 7b, 8b, 9b, 10b, 11b) measured perpendicularly to said side surfaces and to the tool bit axis (Z) is in the range of 0.1 to 0.5 times the thickness of the cutting members (2, 3, 4, 5, 6, 7, 8, 9, 10, 11).

6. A tool bit, as set forth in claim 5, wherein several said expansion joints (2a, 3a, 4a, 5a, 6a, 7a, 8a, 9a, 10a, 11a) are provided in said cutting member (2, 3, 4, 5, 6, 7, 8, 9, 10, 11) subdividing the cutting member measured perpendicularly to the tool bit axis (Z) and to the thickness between said side surfaces into approximately equal sections.

7. A tool bit, as set forth in claim 6, wherein two said expansion joints (2a, 3a, 4a, 5a, 6a, 7a, 8a, 9a, 10a, 11a) are provided for forming three sections of said cutting member, a center section and two outer sections each located on an opposite side of said center section.

8. A tool bit, as set forth in 7, wherein said center section has a centering tip (2d, 3d, 4d, 6d, 7d, 10d, 11d).

9. A tool bit, as set forth in claim 5, wherein said cutting member having a cutting edge (2c, 3c, 4c, 5c, 6c, 7c) converging at an obtuse angle into a centering tip (2d, 3d, 4d, 5d, 6d, 7d).

10. A tool bit, as set forth in claim 9, wherein said cutting edge having surfaces contiguous to said expansion joints (3a, 4a, 5a) located at an angle to one another.

11. A tool bit, as set forth in claim 10, wherein the surfaces of said cutting edges (3c, 4c, 5c) contiguous to said expansion joints (3a, 4a, 5a) extend at an obtuse angle relative to the tool bit axis (Z).

12. A tool bit, as set forth in claim 9, wherein said cutting member (6, 7) having said cutting edge (6c, 7c) comprising surfaces relative to one another offset in the region of said expansion joints (6a, 7a).

13. A tool bit, as set forth in claim 12, wherein said cutting edge (6c) having said surfaces on opposite sides of the said expansion joints (6a) offset in the axial direction.

14. A tool bit, as set forth in claim 12, wherein said cutting edge (7c) having said surfaces contiguous to said expansion joint (7a) offset relative to one another and forming oppositely oriented angles.

15. A tool bit, as set forth in claim 5, wherein said cutting member (2, 3, 4, 5, 6, 7, 9, 10, 11) being shaped as a cutting plate.

16. A tool bit, as set forth in claim 5, wherein said cutting member (8) being shaped as a crosshead cutting member.

17. A tool bit, as set forth in claim 7, wherein said sections of said cutting member (2, 3, 4, 5, 6, 7, 8, 9, 10, 11) having a different material characteristic.

18. A tool bit, as set forth in claim 2, wherein said expansion joint having oppositely spaced sides extending generally in the direction of said axis (Z) with said sides disposed in diverging relationship.

19. A tool bit, as set forth in claim 18, wherein said sides diverge toward said cutting edge.

20. A tool bit, as set forth in claim 18, wherein said sides diverge toward an opposite end of said cutting member from said cutting edge.

\* \* \* \* \*